350-332 SR

7/4/78 XR 4,099,073

United States Patent [19]

Hashimoto et al.

[11] 4,099,073

[45] Jul. 4, 1978

[54] FOUR-LEVEL VOLTAGE SUPPLY FOR LIQUID CRYSTAL DISPLAY

[75] Inventors: Shintaro Hashimoto, Shiki; Yuuichi Sato, Nara, both of Japan

[73] Assignee: Sharp Kabushiki Kaisha, Osaka, Japan

[21] Appl. No.: 717,921

[22] Filed: Aug. 26, 1976

[30] Foreign Application Priority Data

Aug. 27, 1975 [JP] Japan ............................ 50-104423

[51] Int. Cl.[2] ........................ G06F 3/14; G06F 1/00

[52] U.S. Cl. ........................ 307/296 R; 58/23 BA; 307/24; 340/324 M; 340/333; 340/336; 350/332

[58] Field of Search ............... 307/205, 215, 296, 270, 307/31, 24; 58/23 A, 23 BA, 23 D, 50 R; 340/324 M, 333, 336, 166 EL; 350/160 LC

[56] References Cited

U.S. PATENT DOCUMENTS

| | | | |
|---|---|---|---|
| 3,195,011 | 7/1965 | Polin | 58/50 R |
| 3,651,342 | 3/1972 | Dingwall | 307/215 X |
| 3,775,693 | 11/1973 | Proebsting | 307/205 X |
| 3,896,430 | 7/1975 | Hatsukano | 340/336 |
| 3,903,518 | 9/1975 | Hatsukano | 340/336 |
| 3,936,676 | 2/1976 | Fujita | 307/209 X |
| 3,944,330 | 3/1976 | Tsunoda et al. | 350/160 LC |
| 3,949,242 | 4/1976 | Hirasawa et al. | 307/209 X |
| 3,988,616 | 10/1976 | Shimada | 350/160 LC |
| 4,019,178 | 4/1977 | Hashimoto et al. | 350/160 LC |

*Primary Examiner*—Larry N. Anagnos

*Attorney, Agent, or Firm*—Birch, Steward, Kolasch & Birch

[57] ABSTRACT

A power supply circuit supplies a liquid crystal energizing circuit with desired potentials for the purposes of energizing a liquid crystal display in accordance with combinations between first, second, third and reference potentials. The power supply circuit includes a first input terminal connected to a constant voltage source for supplying the first potential, a second input terminal connected to the reference potential, first, second, third, fourth and fifth output terminals for supplying the liquid crystal energizing circuit with desired potentials, impedance means connected between the first input terminal and the second input terminal for deriving the second potential and the third potential therefrom, means for always supplying the first output terminal and the fifth terminal with the first potential and the reference potential respectively, and switching means for determining whether the second, third and fourth output terminals are respectively with the first, second and third potentials or with the second, third and reference potentials. The last named switching means contain only P channel MOS transistors (or N channel MOS transistors).

12 Claims, 10 Drawing Figures

FOUR-LEVEL VOLTAGE SUPPLY FOR LIQUID CRYSTAL DISPLAY

BACKGROUND OF THE INVENTION

The present invention relates to a power supply circuit for providing a liquid crystal display with desired voltage levels. More particularly, the present invention relates to the power supply circuit of the above described type which can simplify circuit configuration and then facilitate fabrication of the power supply circuit.

The inventors have proposed an earlier power supply circuit suitable for supplying a liquid crystal energizing circuit with desired voltage levels or potentials as shown and described in copending application, FOUR-LEVEL VOLTAGE SUPPLY FOR LIQUID CRYSTAL DISPLAY, Ser. No. 685,261, now U.S. Pat. No. 4,050,064, filed May 11, 1976 by Shintaro Hashimoto and Yuuichi Sato and assigned to the same assignee as the present invention, the disclosure of which is incorporated herein by reference. The earlier circuit as shown in FIG. 1, includes an input terminal $In_1$ connected to a reference potential or OV, another input terminal $In_2$ connected to a constant voltage source VC and output terminals *a-e* for providing the liquid crystal display energizing circuit with desired potentials. The input terminal $In_1$ is connected directly to the output terminal *a* and the second input terminal $In_2$ is connected directly to the output terminal *e*. Resistors $R_1$, $R_2$, $R_3$ and $R_4$ of the substantially same resistance value are serially connected between the input terminals $In_1$ and $In_2$ and the output terminals *b, c* and *d* are coupled with the respective middle points of the series circuit of $R_1$, $R_2$, $R_3$ and $R_4$.

There is also provided a complementary MOS circuit which comprises a P channel MOS transistor $Tr_8$ connected in parallel with the resistor $R_1$ and an N channel MOS transistor $Tr_9$ connected in parallel with the resistor $R_4$. The transistors $Tr_8$ and $Tr_9$ are switchable between ON and OFF states in response to control signals A.

When the control signal A is OV, the transistor $Tr_9$ is ON to establish a short circuit between $In_2$ and *d* such that voltage between $In_1$ and $In_2$ is divided through the use of the resistors $R_1$, $R_2$ and $R_3$ to produce outputs VA, VB and VC via terminals *b-d*. It is concluded that *a* = OV, *b* = VA, *c* = VB and *d* = *e* = VC. For the DSM type of liquid crystal displays with an ignition voltage of 18V, VC = −18V, VB = −12V and VA = −6V.

Conversely, when the control signal A is VC (−18V), the transistor $Tr_8$ is ON to establish a short circuit between $In_1$ and *b* such that voltage between $In_1$ and $In_2$ is divided by $R_2$, $R_3$ and $R_4$ thereby to produce outputs VA and VB via C and D at terminals *c, d,* and *e*. As a consequence, *a* = *b* = OV, *c* = VA, *d* = VB and *e* = VC.

Nevertheless, although the above described power supply circuit including as the switching means the complementary MOS circuit as shown in FIG. 1 is advantageous from the viewpoint of circuit technique since the complementary MOS circuit provides output voltage levels approximately equal to the input voltage levels, it is still difficult to fabricate the complementary MOS circuit configuration at a low cost.

Accordingly, it is an object of the present invention to provide an improvement in the earlier proposed liquid crystal display driving circuit which does not include a complementary MOS transistor circuit configuration as a switching means. In accordance with the concept of the present invention, the power supply circuit for the liquid crystal display energizing circuit is adapted in such a way as to constitute the switching means by only P channel MOS transistors (or N channel MOS transistors).

BRIEF DESCRIPTION OF THE DRAWING

A better understanding of the present invention may be had from a consideration of the following detailed description taken in conjunction with the accompanying drawing in which.

DETAILED DESCRIPTION OF THE INVENTION

Figure 1:
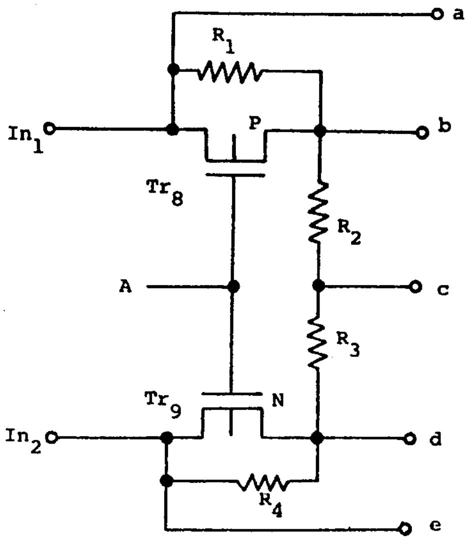
FIG. 1 is a circuit diagram of a power supply circuit using complementary MOS transistors.
Figure 2:
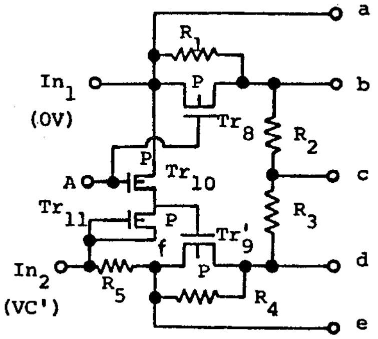
FIG. 2 is a circuit diagram of a power supply circuit constructed in accordance with one preferred form of the present invention.

Referring now to FIG. 2, there is illustrated a power supply circuit constructed in accordance with the present invention which includes the same parts as shown in FIG. 1, that is, the input terminals $In_1$, $In_2$, the output terminals *a–e* and the resistors $R_1$, $R_2$, $R_3$, $R_4$. While the P channel MOS transistor $Tr_8$ is connected in parallel with the resistor $R_1$ in the similar manner, a P channel MOS transistor $Tr_9'$ (not N channel MOS transistor as in FIG. 1) is connected in parallel with the resistor $R_4$. The control signal A is applied to the gate of the transistor $Tr_8$ and the inverted signal via an inverter is applied to the gate of the transistor $Tr_9'$. It will be noted that the above inverter comprises P channel MOS transistors $Tr_{10}$, $Tr_{11}$. An additional resistor $R_5$ is provided in series with the resistor $R_4$ and the P channel transistor $Tr_9'$.

In the case where as in FIG. 2 the switching means are constituted by the P channel MOS transistors $Tr_8$ and $Tr_9'$, when the control signal A is OV, the transistor $Tr_9'$ is ON to short between $In_2$ and *d*. When the control signal A is VC', the transistor $Tr_8$ is ON to short between $In_1$ and *b*.

Figure 3:
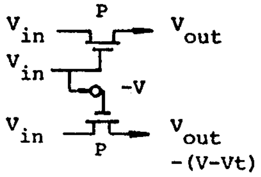
FIG. 3 is an explanatory diagram for the purposes of illustrating the operation of the circuit of FIG. 2.

As viewed from FIG. 3, when the gate is −V and the source is −V for the P channel MOS transistors, $V_{OUT}$ will be reduced by the threshold voltage $V_t$ and thus assume $-(V - V_t)$. This implies that −V cannot be outputted as $V_{OUT}$. It will be understood that with the complementary MOS transistor configuration set forth in the foregoing paragraphs with respect to FIG. 1, −V can be completely outputted as $V_{OUT}$.

To this end, in FIG. 2 the source of the transistor $Tr_9'$ is connected to the point $f$ (the junction with the output terminal $e$). If the voltage $fV$ at that point is for example −6V, the gate voltage of the transistor $Tr_9'$ should be negative with respect to the source voltage namely −6V by at least the threshold voltage (generally, −2 to −3V) in order to derive −6V via the drain of the transistor $Tr_9'$ or $d$. The OFF output voltage of the inverter of $Tr_{10}$ and $Tr_{11}$ should be therefore decreased to such extent. The OFF output voltage of the inverter is determinative upon the constant voltage source VC' at $In_2$ and therefore is $VC'-V_t$. VC' is preliminarily established to be at least $fV + 2V_t$ and thus −6V of $fV$ is outputted via $d$.

The resistor $R_5$ provided between $In_2$ and $f$ is selected to meet the predetermined interrelationship between VC' of $In_2$ and $fV$ of $f$. In other words, when $Tr_8$ is ON and $Tr_9$ is OFF the potential $fV$ at the point $f$ is written as follows:

$$fV = \frac{R_2 + R_3 + R_4}{R_2 + R_3 + R_4 + R_5} \cdot VC$$

And when $Tr_8$ is OFF and $Tr_8'$ is ON the potential $fV$ is as follows:

$$fV = \frac{R_1 + R_2 + R_3}{R_1 + R_2 + R_3 + R_5} \cdot VC$$

It will be obvious from the above equations that if $R_1 = R_4$ is satisfied, $fV$ becomes fixed. Proper choice of the resistor $R_5$ enables establishment of desired interrelationship between VC' and $fV$. A Zener diode may be employed instead of the resistor $R_5$ to set $fV$ of the point $f$.

In FIG. 2, VC' of $In_2$ is, in fact, selected at −16V and the output of $Tr_{10}$ is about −12 to −13V. Accordingly, since sufficiently low voltage is applied to the gate of $Tr_{10}$, −6V of $f$ can be derived from $d$ without any variations therein.

With such an arrangement, when the control signal A is OV, $Tr_9'$ is ON to establish a short circuit between $In_2$ and $d$ such that voltage division through the resistors $R_1$, $R_2$ and $R_3$ results in $d = e = -6V$, $c = -4V$, $b = -2V$ and $a = OV$. The liquid crystal display of the FEM type is ignited upon application of 6V. Conversely, when the control signal A is VC', $Tr_8$ is ON to short the circuit between $In_1$ and $b$ such that $a = b = OV$, $c = -2V$, $d = -4V$ and $e = -6V$ through the use of the voltage divider of $R_2$, $R_3$ and $R_4$.

Figure 4:
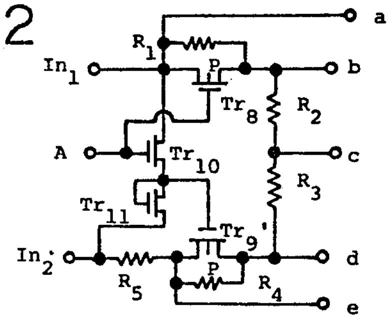
FIG. 4 is a circuit diagram of another preferred form of the present invention.

FIG. 4 is a modification in the circuit of FIG. 2 wherein the inverter circuit is implemented with a MOS device of the ED (enhancement/depletion) type. $Tr_{10}$ is of the enhancement type while $Tr_{11}$ is of the depletion type. Since the gate voltage of $Tr_9'$ is in proximity to VC' of $In_2$, it is not necessary that VC' be negative to such extent as discussed above.

Figure 5:
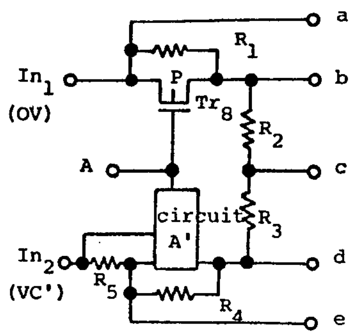
FIG. 5 is a circuit diagram of still another preferred form of the present invention.

FIG. 5 shows still another preferred form of the invention which resembles that of FIG. 2 with exception of the transistor $Tr_9'$ and the inverter circuit. The portion including the transistor $Tr_9'$ and the inverter circuit is denoted as circuit A'.

Figure 6:
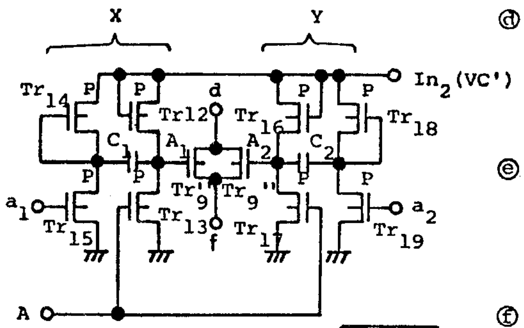
FIG. 6 is a circuit diagram of the portion A of the circuit of FIG. 5.

The circuit A' is of the circuit configuration as shown in FIG. 6 wherein P channel MOS transistors $Tr_9'$ and $Tr_9''$ are connected in parallel with the sources connected to the point $f$ (the junction with the output terminal $e$) and the drains connected to the junction with the output terminal $d$.

The circuit A' comprises a pair of bootstrap circuits X and Y coupled to output $fV$ of the point $f$ via the output terminal $d$ and $\frac{2}{3}fV$ via the output terminal $d$.

On the first bootstrap circuit X there is provided an inverter circuit of P channel MOS transistors $Tr_{12}$ and $Tr_{13}$ at a one terminal of a capacitor $C_1$, the one terminal of the capacitor $C_1$ being biased through a MOS resistor of $Tr_{12}$ and the other terminal thereof being switchable through a MOS circuit of the ED type consisting of transistors $Tr_{14}$ and $Tr_{15}$. Repetition signals $a_1$ of relatively high frequency are supplied for $Tr_{15}$.

To this end, the output voltage of $Tr_{15}$ and in other words the other terminal of the capacitor $C_1$ assumes OV and VC' (for example −6V). When OV, the capacitor $C_1$ is charged to about $|VC'|$. At a moment that the output of $Tr_{15}$ is changed from OV to VC', the potential of $A_1$ (the one terminal of the capacitor $C_1$) will be changed from VC' to 2VC'. If the output of $A_1$ is applied to the gate of $Tr_9'$ to effectively utilize such variation to 2VC', VC' of the point $f$ can be outputted via the output terminal $d$ because of the gate held at 2VC'.

The potential of 2VC' is not of a permanent character and therefore varies in accordance with developments of the discharge procedure. Therefore, $Tr_9'$ is rendered ON for only a short period of time. For this reason VC' or $\frac{2}{3}$VC' cannot be continuously outputted via the output terminal $d$. The P channel MOS transistor $Tr_9''$ of the second bootstrap circuit Y, therefore, is connected in parallel with $Tr_9'$. The output of $A_2$ applied to the gate of $Tr_9''$ permits VC' of the point $f$ to be outputted via the output terminal $d$ without variations and therefore VC' or $\frac{2}{3}$VC' to be permanently outputted via the output terminal $d$ in cooperation with the first bootstrap circuit X.

The output of $A_2$ set forth above is obtainable from the second bootstrap circuit Y in the same manner as that of the circuit X. The repetition signals $a_2$ are applied to $Tr_{19}$ within the MOS circuit device of the ED type.

Figure 7:
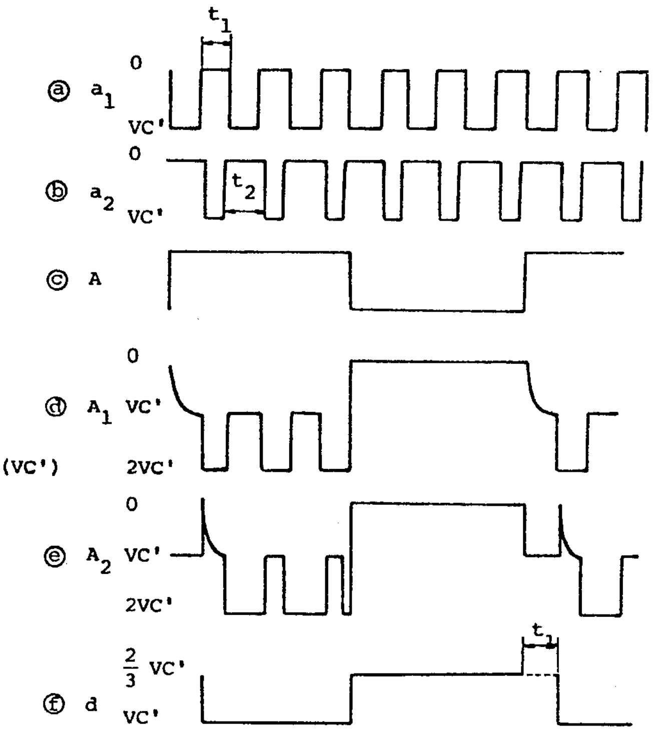
FIG. 7 is a timing diagram of waveforms of signals which occur within the circuit of FIG. 6.

FIG. 7 is a timing diagram showing waveforms of signals within the circuit of FIG. 6. The signals $a_1$ and $a_2$ are of the waveforms designated ⓐ and ⓑ such that periods of time for remaining OFF state of $Tr_{15}$ and $Tr_{19}$ are different but somewhat overlapped with each other. ⓒ designates the waveform of the control signal A, ⓓ designates that of the output of $A_1$, ⓔ designates that of the output of $A_2$ and ⓕ designates that of the output of the output terminal $d$.

When the control signal A is OV, $Tr_{12}$ and $Tr_{16}$ are ON. When the $a_1$ signal is OV, the output of $Tr_{15}$ is OFF and hence VC'. The potential of $A_1$ falls from VC' to 2VC' to make $Tr_9'$ ON. If the $a_2$ signal is OV, $Tr_{19}$ is OFF and its output is VC'. As a result, the potential of $A_2$ falls from VC' to 2VC' thereby to render $Tr_9''$ ON. As ON period for $Tr_9'$ is placed to overlap with that for $Tr_9''$, $fV = VC'$ of the point $f$ is successively developed at the output terminal $d$ as suggested by ⓕ.

On the other hand, when the control signal A is VC', $Tr_{13}$ and $Tr_{17}$ are ON to keep the potentials of $A_1$ and $A_2$ at OV and in addition to render $Tr_9'$ and $Tr_9''$ OFF. This is the correspondence to that the circuit A' of FIG. 5 is rendered OFF.

In summary, when the control signal A is OV, $Tr_9'$ and $Tr_9''$ are ON to establish shorted circuit between $In_2$ and the output terminal $d$, followed by that voltage division is effected by the resistors $R_1$, $R_2$ and $R_3$ and consequently $d = e = -6V$, $c = -4V$, $b = -2V$ and $a = OV$. Conversely, when the control signal A is VC', $Tr_8$ is ON and circuit between $In_1$ and $b$ is shunted such that voltage division by the resistors $R_1$, $R_2$ and $R_3$ results in $a = b = OV$, $c = -2V$, $d = 4V$ and $e = -6V$. Provision of the constant voltage source of more negative voltage as shown in FIG. 2 is not needed due to a parallel combination of the two bootstrap circuits X and Y as shown in FIG. 6. Therefore, a constant voltage source of −6V can be employed (in FIG. 2 −16V) and $Tr_8$ and $Tr_9'$ as switching means can be implemented with a P channel MOS transistor.

As depicted by (f) showing the waveform of the output at the output terminal $d$ in FIG. 7, under the conditions the control signal A is OV, the signal $a_1$ is VC' and the signal $a_2$ is OV at the time $t_0$, $Tr_8$, $Tr_9'$ and $Tr_9''$ are to be OFF (as $A_2$ is not 2VC'). Thus, $fV$ of the point $f$ has to be outputted via the output terminal $d$ since $Tr_8$ and the circuit A' are both placed in OFF state in FIG. 5. However, there is created the possibility of providing undesired potentials. By sufficiently increasing frequency of the signals $a_1$ and $a_2$ as compared with frequency of the control signal A, the possibility can be avoided or ignored.

Although in the circuit of FIG. 6 $Tr_{14}$ and $Tr_{15}$ are of the ED type MOS configuration, they may be in the same form as the P channel MOS transistor $Tr_{12}$.

Figure 8:
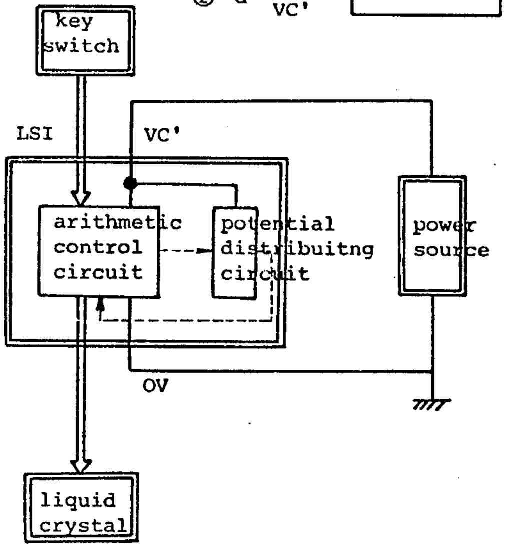
FIG. 8 is a block diagram of a peripheral configuration of the power supply circuit of the present invention.

FIG. 8 is a schematic of a peripheral circuit arrangement which utilizes the potential distributing circuits stated above with respect to FIGS. 2, 4 and 5. By way of a one chip MOS/LSI calculator, an LSI chip internally contains the potential distributing circuit in addition to a conventional arithmetic control circuit. The LSI chip is supplied with VC' from the constant voltage source. And, as obvious in the art of calculators, the LSI chip receives key signals from a keyboard and provides display signals for a liquid crystal display. The constant voltage source VC' is coupled as $V_{DD}$ to enable terminals of the LSI chip to energize P channel MOS transistors within the control circuit.

For example, in the case where VC' of −16V as shown in FIG. 2 is employed, P channel MOS transistors within the control circuit are of the high threshold type powered with −16V, thereby reducing the number of power or enable terminals of the LSI chip as small as possible. In many cases, the LSI chip needs $V_{GG}$ power source somewhat smaller than $V_{DD}$ for establishment of clock pulse levels but VC' may be the correspondence to $V_{GG}$.

Figure 9:
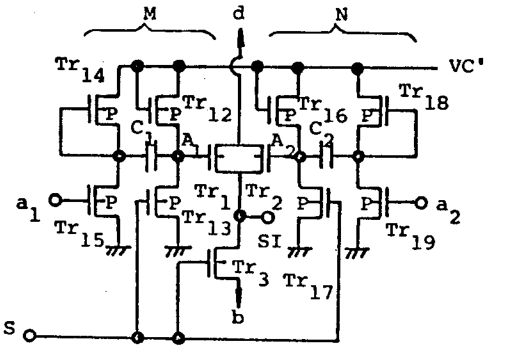
FIG. 9 is a circuit diagram of a circuit providing segment signals for a liquid crystal display.

FIG. 9 shows an example of a circuit arrangement adapted for providing segment signals SI in response to the potentials from the potential distributing circuit. This comprises a couple of bootstrap circuits M and N and resembles essentially the circuit arrangement shown in FIG. 6 wherein the P channel MOS transistors $Tr_1$ and $Tr_2$ are connected in parallel. The commonly connected sources of $Tr_1$ and $Tr_2$ are led to the output terminal of the segment signal SI and the drain of a P channel MOS transistor $Tr_3$. The drains of $Tr_1$ and $Tr_2$ are connected to the output terminal $d$ of the potential distributing circuit. $Tr_3$ has its source connected to the output terminal $b$ of the potential distributing circuit and its gate receiving segment selection signals (s). The circuit arrangement including a capacitor $C_1$, $Tr_{12}$ to $Tr_{15}$ within the bootstrap circuit M and a capacitor $C_2$, $Tr_{16}$ to $Tr_{18}$ within the bootstrap circuit N, operates in the same mode as that of FIG. 6.

Figure 10:
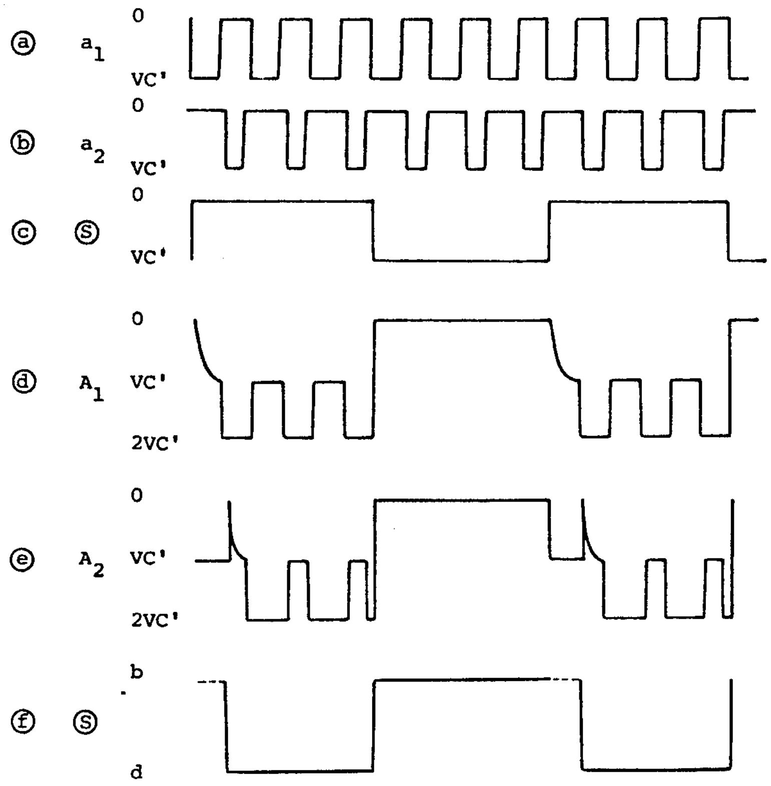
FIG. 10 is a timing diagram of signals which occur within the circuit of FIG. 9.

A time diagram of the waveforms of signals in operation of the circuit of FIG. 9 is shown in FIG. 10. (a) designates the signal $a_1$ applied to the gate of $Tr_{15}$, (b) designates the signal $a_2$ applied to the gate of $Tr_{19}$, (c) designates coincidence between the control signal A and the segment selection signal (s) which is derived via a decoder from a register, (d) designates the waveform of the output of $A_1$, (e) designates the waveform of the output of $A_2$ and (f) designates the waveform of the segment signal SI. The segment SI assumes either one of the potentials supplied from the output terminals $b$ and $d$ in accordance with the potential of the segment selection signal (s).

Although there has been described above a specific arrangement of the liquid crystal power supply circuit in accordance with the invention for the purpose of illustrating the manner in which the invention may be used to advantage, it will be appreciated that invention is not limited thereto. Accordingly, any modifications, variations or equivalent arrangements which may occur to those skilled in the art should be considered to be within the scope of the invention.

What is claimed is:

1. A power supply circuit for supplying a liquid crystal display energizing circuit with desired potentials for the purposes of energizing a liquid crystal display in accordance with combinations between first, second, third and reference potentials, comprising:
   - a first input terminal for supplying the first potential, connected to a constant voltage source;
   - a second input terminal connected to the reference potential;
   - first, second, third, fourth and fifth output terminals connected for supplying the liquid crystal display energizing circuit with desired potentials;
   - impedance means connected between the first input terminal and the second input terminal for deriving the second potential and the third potential therefrom;
   - means for always supplying the first output terminal and the fifth output terminal with the first potential and the reference potential, respectively; and
   - switching means for controlling whether the second, third and fourth output terminals are respectively supplied with the first, second and third potentials or with the second, third and reference potentials; said switching means comprising field effect mode transistors of the same channel conductivity type.

2. A power supply circuit as set forth in claim 1 wherein the field effect mode transistors are of the P channel MOS type.

3. A power supply circuit as set forth in claim 1 wherein the field effect mode transistors are of the N channel MOS type.

4. A power supply circuit as set forth in claim 2 wherein said switching means comprises a pair of P channel MOS transistors.

5. A power supply circuit as set forth in claim 4 wherein one of the two P channel MOS transistors has a source-to-drain circuit connected between the first input terminal and the second output terminal and the other of the two P channel MOS transistors has a source-to-drain circuit connected between the second input terminal and the fourth output terminal.

6. A power supply circuit as set forth in claim 5 wherein impedance means are provided between the first input terminal and the source-to-drain circuit of said one of the two P channel MOS transistors.

7. A power supply circuit as set forth in claim 6 wherein an inverter circuit is provided and in circuit with the said one of the two P channel MOS transistors.

8. A power circuit as set forth in claim 7 wherein the inverter comprises a couple of P channel MOS transistors.

9. A power supply circuit as set forth in claim 8 wherein the P channel MOS transistors are of the enhancement/depletion type.

10. A power supply circuit as set forth in claim 1 wherein said switching means comprises a pair of bootstrap circuits.

11. A power supply circuit as set forth in claim 10 wherein each of said bootstrap circuits has a capacitor adapted to be biased.

12. A power supply circuit as set forth in claim 11 wherein each of said bootstrap circuits has a field effect mode transistor to control charging and discharging of said capacitor.

* * * * *